US006820181B2

(12) United States Patent
Jeddeloh et al.

(10) Patent No.: US 6,820,181 B2
(45) Date of Patent: Nov. 16, 2004

(54) METHOD AND SYSTEM FOR CONTROLLING MEMORY ACCESSES TO MEMORY MODULES HAVING A MEMORY HUB ARCHITECTURE

(75) Inventors: Joseph M. Jeddeloh, Shoreview, MN (US); Terry R. Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 68 days.

(21) Appl. No.: 10/232,473

(22) Filed: Aug. 29, 2002

(65) Prior Publication Data

US 2004/0044857 A1 Mar. 4, 2004

(51) Int. Cl.[7] .............................................. G06F 12/00
(52) U.S. Cl. ........................................ 711/169; 710/52
(58) Field of Search ......................... 711/105, 167–169, 711/154; 710/52–57; 370/463

(56) References Cited

U.S. PATENT DOCUMENTS

| | | | |
|---|---|---|---|
| 5,544,319 A | 8/1996 | Acton et al. ............ 395/200.07 |
| 5,818,844 A * | 10/1998 | Singh et al. ................. 370/463 |
| 5,822,255 A | 10/1998 | Uchida ........................ 365/194 |
| 5,875,454 A | 2/1999 | Craft et al. ................. 711/113 |
| 6,033,951 A | 3/2000 | Chao ........................... 438/253 |
| 6,067,262 A | 5/2000 | Irrinki et al. ................ 365/201 |
| 6,079,008 A | 6/2000 | Clery, III ...................... 712/11 |
| 6,186,400 B1 | 2/2001 | Dvorkis et al. ........ 235/462.45 |
| 6,243,831 B1 | 6/2001 | Mustafa et al. .............. 714/24 |
| 6,246,618 B1 | 6/2001 | Yamamoto et al. ......... 365/200 |
| 6,256,692 B1 | 7/2001 | Yoda et al. .................. 710/104 |
| 6,272,609 B1 * | 8/2001 | Jeddeloh ..................... 711/169 |
| 6,392,653 B1 | 5/2002 | Malandain et al. .......... 345/501 |
| 6,438,668 B1 | 8/2002 | Esfahani et al. ............ 711/165 |
| 6,462,978 B2 | 10/2002 | Shibata et al. ................ 365/63 |
| 6,477,592 B1 * | 11/2002 | Chen et al. ................... 710/52 |
| 6,523,092 B1 | 2/2003 | Fanning ...................... 711/134 |
| 6,523,093 B1 | 2/2003 | Bogin et al. ................ 711/137 |
| 6,590,816 B2 | 7/2003 | Perner ........................ 365/200 |
| 6,622,227 B2 * | 9/2003 | Zumkehr et al. ........... 711/167 |
| 6,631,440 B2 * | 10/2003 | Jenne et al. ................ 711/105 |
| 6,636,110 B1 | 10/2003 | Ooishi et al. ............... 327/565 |
| 6,681,292 B2 | 1/2004 | Creta et al. ................. 711/119 |
| 2002/0112119 A1 | 8/2002 | Halbert et al. .............. 711/115 |
| 2002/0144064 A1 | 10/2002 | Fanning ...................... 711/144 |
| 2003/0005223 A1 | 1/2003 | Coulson et al. ............. 711/118 |
| 2003/0043426 A1 | 3/2003 | Baker et al. ................ 359/109 |
| 2003/0229770 A1 | 12/2003 | Jeddeloh ..................... 711/213 |

OTHER PUBLICATIONS

Intel, "Intel 840 Chipset: 82840 Memory Controller Hub (MCH)", Datasheet, Oct. 1999, pp. 1–178.

* cited by examiner

Primary Examiner—Nasser Moazzami
(74) Attorney, Agent, or Firm—Dorsey & Whitney, LLP

(57) ABSTRACT

A computer system includes a memory hub controller coupled to a plurality of memory modules. The memory hub controller includes a memory request queue that couples memory requests and corresponding request identifier to the memory modules. Each of the memory modules accesses memory devices based on the memory requests and generates response status signals from the request identifier when the corresponding memory request is serviced. These response status signals are coupled from the memory modules to the memory hub controller along with or separate from any read data. The memory hub controller uses the response status signal to control the coupling of memory requests to the memory modules and thereby control the number of outstanding memory requests in each of the memory modules.

63 Claims, 4 Drawing Sheets

| COMMAND CODE | COMMAND | CONTROL | COMMENT |
|---|---|---|---|
| 0000 | NOP | NA | |
| 0001 | DWORD MEMORY WRITE | COUNT | 1 TO 16 DOUBLE WORDS WRITTEN TO MEMORY |
| 0010 | DWORD MEMORY READ | COUNT | 1 TO 16 DOUBLE WORD READ FROM MEMORY |
| 0011 | UNUSED | | |
| 0100 | UNUSED | | |
| 0101 | BYTE MEMORY WRITE | MASK | 1 TO 16 BYTES WRITTEN TO MEMORY |
| 0110 | BYTE MEMORY READ | MASK | 1 TO 16 BYTE READ TO MEMORY |
| 0111 | UNUSED | | |
| 1000 | CONFIG READ | MASK | |
| 1001 | CONFIG WRITE | MASK | |
| 1010-1111 | UNUSED | | |

| COMMAND CODE | COMMAND | COMMENT |
|---|---|---|
| 000 | NOP | |
| 001 | READ RESPONSE | RETURNING READ DATA |
| 010 | WRITE RESPONSE | WRITE COMPLETE |
| 011 | READ & WRITE RESPONSE | WRITE COMPLETE AND RETURNING READ DATA |
| 100 | UNUSED | |
| 101 | UNUSED | |
| 110 | UNUSED | |
| 111 | UNUSED | |

METHOD AND SYSTEM FOR CONTROLLING MEMORY ACCESSES TO MEMORY MODULES HAVING A MEMORY HUB ARCHITECTURE

TECHNICAL FIELD

This invention relates to memory systems, and, more particularly, to a memory system having several memory modules each of which includes a memory hub coupled to several memory devices.

BACKGROUND OF THE INVENTION

Computer systems use memory devices, such as dynamic random access memory ("DRAM") devices, to store instructions and data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

The operating speed of memory devices has continuously increased, thereby providing ever-increasing memory bandwidths. However, this increase in memory bandwidth has not kept pace with increases in the operating speed of processors. One approach to increasing memory bandwidth is to access a larger number of memory devices in parallel with each other so that this data are read from or written to this larger number of memory devices with each memory access. One memory architecture that lends itself well to allowing a larger number of memory devices to be simultaneously accessed is a memory hub architecture. In a memory hub architecture, a system controller or memory hub controller is coupled to several memory modules, each of which includes a memory hub coupled to several memory devices. The memory hub efficiently routes memory requests and responses between the controller and the memory devices. Computer systems employing this architecture can have a higher bandwidth because a processor can read data from or write data to one memory module while another memory module is responding to a prior memory access. For example, the processor can output write data to the memory devices in one of the memory modules while the memory devices in another memory module are preparing to provide read data to the processor.

Although memory modules using memory hubs may provide increased memory bandwidth, the presence of memory hubs in the modules can make it difficult to coordinate the flow of command and address signals to the memory modules and the flow of data signals to and from the memory modules. A memory controller in a conventional memory system directly access memory devices in memory modules. The absence of any control device, such as a memory hub, between the memory controller and the memory devices makes it relatively easy for the memory controller to coordinate its operation with each of the memory modules. In particular, since the memory controller is actively controlling the activity in each of the memory modules, the memory controller is able to determine the status of memory accesses to each memory module based on the signals it has transmitted to or received from the memory modules. In contrast, the presence of a memory hub on each of the memory modules to control access to the memory devices makes it difficult for a controller to determine the status of memory requests to each memory module since the controller is no longer directly controlling the memory accesses. For example, the controller can no longer determine when a read memory request will be issued to the memory devices on that module. Since the controller cannot determine when the read memory request is issued, it cannot determine when the read data will be coupled from the memory module. As a result, the controller cannot determine when it can issue another read or write memory request to the same or another memory module. Similarly, the controller cannot determine if several memory requests issued to a memory module have been serviced, and thus cannot determine whether additional memory requests should be issued to the memory module. Other types of coordination issues will be apparent to one skilled in the art.

There is therefore a need for a memory system architecture that allows a controller or other device coupled to a plurality of hub-based memory modules to coordinate the issuing of memory requests to the memory modules.

SUMMARY OF THE INVENTION

A memory module hub controller is coupled to a plurality of memory modules each of which includes a memory hub coupled to a plurality of memory devices in the respective module. The memory hub controller stores a plurality of memory requests and transmits each stored memory request to the memory hub in one of the memory modules responsive to a flow control signal that is generated as a function of memory request status signals received from the memory hub to which the memory request is being transmitted. The memory hub stores the received memory requests and couples memory request signals corresponding to the stored memory requests to the memory devices in the memory module. The memory hub also transmits write data to or subsequently receives read data from the memory devices. The memory hub also generates memory request status signals identifying the memory requests that have been serviced by the memory devices coupled to the memory hub. The memory hub then couples the memory request status signals and any read data to the memory hub controller. The controller outputs the received read data and generates the flow control signal based on the memory request status signals to control the number of outstanding memory requests that are stored in each of the memory modules.

DETAILED DESCRIPTION OF THE INVENTION

Figure 1:
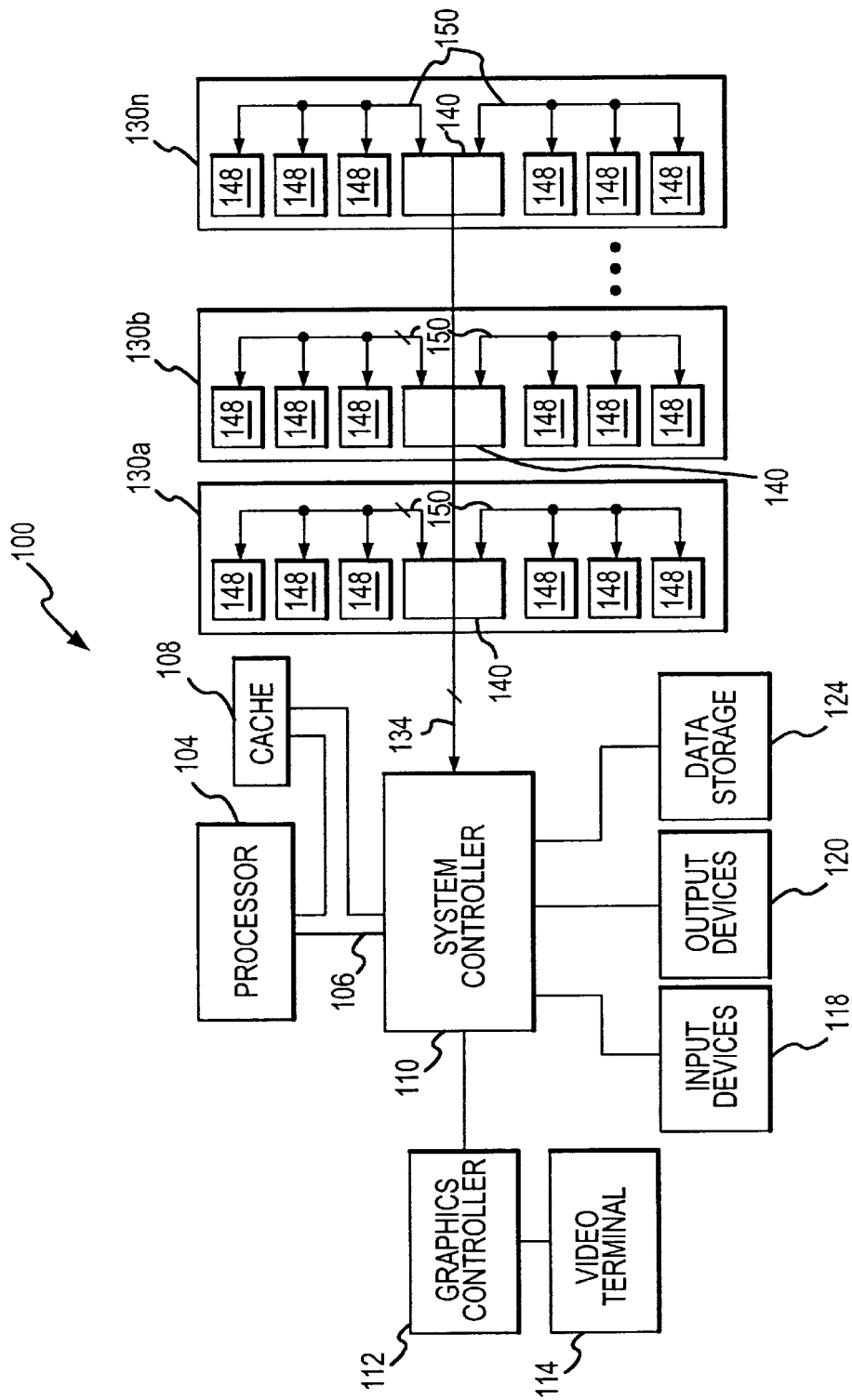
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 also includes a memory hub controller 126 that is coupled to several memory modules 130a,b . . . n, which serve as system memory for the computer system 100. The memory modules 130 are preferably coupled to the memory hub controller 126 through a high-speed link 134, which may be an optical or electrical communication path or some other type of communications path. In the event the high-speed link 134 is implemented as an optical communication path, the optical communication path may be in the form of one or more optical fibers, for example. In such case, the memory hub controller 126 and the memory modules 130 will include an optical input/output port or separate input and output ports coupled to the optical communication path. The memory modules 130 are shown coupled to the memory hub controller 126 in a multi-drop or daisy chain arrangement in which the single high-speed link 134 is coupled to all of the memory modules 130. However, it will be understood that other topologies may also be used, such as a point-to-point coupling arrangement in which a separate high-speed link (not shown) is used to couple each of the memory modules 130 to the memory hub controller 126. A switching topology may also be used in which the memory hub controller 126 is selectively coupled to each of the memory modules 130 through a switch (not shown). Other topologies that may be used will be apparent to one skilled in the art.

Figure 2:
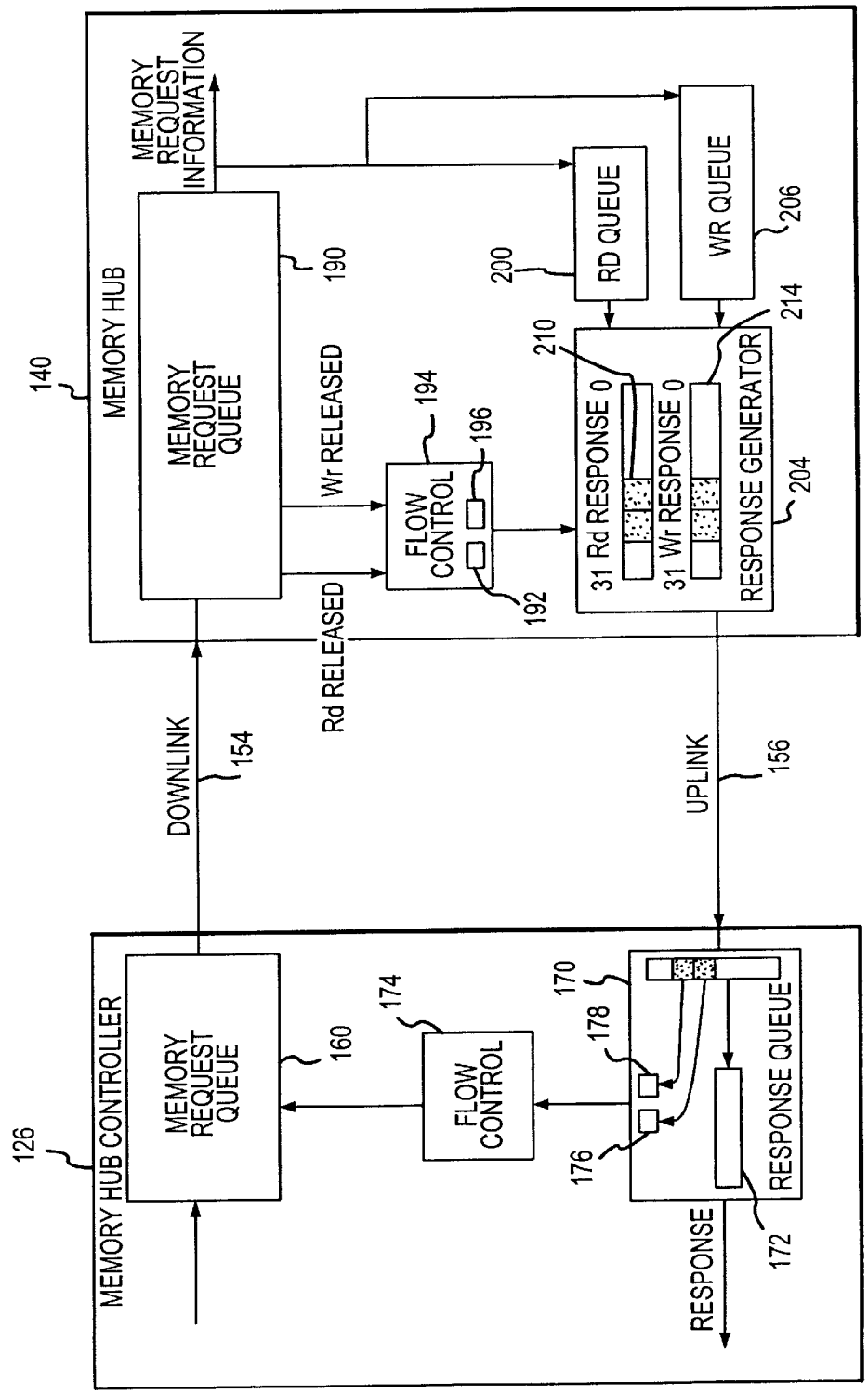
FIG. 2 is a block diagram of one example of a memory hub controller used in the computer system of FIG. 1 coupled to one example of a memory hub used in each of a plurality of memory modules in the computer system of FIG. 1.

Each of the memory modules 130 includes a memory hub 140 for controlling access to 6 memory devices 148, which, in the example illustrated in FIG. 2, are synchronous dynamic random access memory ("SDRAM") devices. However, a fewer or greater number of memory devices 148 may be used, and memory devices other than SDRAM devices may, of course, also be used. The memory hub 140 is coupled to each of the memory devices 148 through a bus system 150, which normally includes a control bus, an address bus and a data bus.

One example of the memory hub controller 126 and the memory hub 140 of FIG. 1 is shown in FIG. 2. As shown in FIG. 2, the high-speed link 134 (FIG. 1) coupling the memory hub controller 126 to the memory hub 140 includes a high-speed downlink 154 and a high-speed uplink 156 that are separate from each other. As previously explained, the downlink 154 and uplink 156 may couple logic signals, optical signals, RF signals or any other type of signaling medium. The downlink 154 and uplink 156 may also be combined in a single high-speed bi-directional link, or the downlink 154 and the uplink 156 may be further divided into a larger number of communication links, such as separate links for the command, address and data signals. Other variations will be apparent to one skilled in the art.

With further reference to FIG. 2, the memory hub controller 126 includes a memory request queue 160 that receives from the processor 104 (FIG. 1) though the system controller 110 high level memory request signals, including command signals, address signals and, in the case of a memory write, write data signals. The memory request queue 160 also receives Request ID signals from a flow control unit 174 that uniquely identify each read request and each write request. These Request IDs are combined with corresponding high level read requests and write requests and stored in the memory request queue 160, preferably in the order they are received. The memory request signals stored in the request queue 160 include both read request signals and write request signals. The high level memory request signals and the Request ID signals will collectively be referred to as memory request signals. The memory request queue may but need not issue the signals to the memory modules 130 in the same order they are received.

The memory hub controller 126 also includes a memory response queue 170 that receives read response signals and write response signals from the system controller 110. The read response signals include read data signals as well as read status signals that identify the read request corresponding to the read data. The write response signals include write status signals that identify a write request that has been serviced by one of the memory modules. The response queue 170 stores the memory response signals in the order they are received, and it preferably, but not necessarily, couples the read data signals 172 to the system controller 110 in that same order. The memory response queue 170 also couples to the flow control unit 174 the read status signals 176 and the write status signals 178 so that the flow control unit 174 can determine which read requests and which write requests have been serviced. The flow control unit 174 makes this determination by comparing the status signals 176, 178 to the Request IDs generated by the flow control unit 174 and coupled to the memory request queue 160. The flow control unit 174 then outputs flow control signals to the memory request queue 160 to allow the memory request queue 160 to determine whether and when it should issue additional memory requests to each of the memory modules 130 (FIG. 1).

With further reference to FIG. 2, the memory hub 140 in each of the memory modules 130 includes a memory request queue 190 that receives one or more memory requests from the memory hub controller 126 through the high-speed downlink 154. The request queue 190 includes circuitry similar to that found in conventional memory controllers to reformat the memory requests to the command and address signals used by the memory devices 148 (FIG. 1) and to issue these reformatted signals to the memory devices 148 at the proper time and sequence. For example, the request queue 190 may convert addresses signals received from the memory hub controller 126 to row and column address signals. The request queue 190 can then output the row address signals to the memory devices 148 along with a row address strobe ("RAS") signal to cause the row address signals to be latched into the memory devices 148. Similarly, the request queue 190 can output the column address signals to the memory devices 148 along with a column address strobe ("CAS") signal to cause the column address signals to be latched into the memory devices 148. However, the nature of the reformatted command and address signals and also possibly data signals will depend upon the nature of the memory devices 148, as will be apparent to one skilled in the art.

When the request queue 190 has issued the reformatted read request signals to the memory devices 148 responsive to read request signals from the memory hub controller 126, it applies a Read Released signal to a flow control unit 194 to indicate that a read request has been issued to the memory devices 148. Similarly, when the request queue 190 has issued the reformatted write request signals to the memory devices 148 responsive to write request signals from the memory hub controller 126, it applies a Write Released signal to the flow control unit 194 to indicate that a write request has been issued to the memory devices 148. The Read Released and Write Released signals are used to formulate the read and write status signals 192, 196, respectively, that uniquely identify each read request and write request serviced by each of the memory modules 130. More specifically, the flow control unit 194 assigns a unique read response ID, which preferably corresponds to the Request ID coupled to the memory request queue 160 from the flow control unit 174, to each released read request. The flow control unit 194 also assigns a unique write response ID to each released write request, which preferably also corresponds to the Request ID. These response IDs are coupled to the response queue 170 as read and write status signals. As previously explained, these status signals are coupled to the memory response queue 170, which separates the status signals from any read data included in the response and couples the status signals to the flow control unit 174.

In response to a read memory request from the request queue 190, the memory devices 148 couples read data signals to the memory hub 140. These read data signals are stored in a read queue 200. The read queue 200 subsequently couples the read data signals to a response generator 204, which also receives the read status signals 192 from the flow control unit 194.

When the request queue 190 issues write requests, signals indicating that the write requests have been issued are stored in a write queue 206. The write queue 206 subsequently couples the signals indicative of issued write requests to the response generator 204, which also receives the write status signals 196 from the flow control unit 194.

The response generator 204 associates the read data signals from the read queue 200 with the read status signals 192 from the flow control unit 194, which, as previously mentioned, identifies the read request corresponding to the read data. The combined read data signals and read status signals 192 are combined into a read response 210. In response to the signals from the write queue 206, the response generator 204 generates a write response 214 containing the write status signals 192. The response generator 204 then transmits the read response 210 or the write response 214 to the response queue 170 in the memory hub controller 126. More specifically, the read data signals are transmitted from the response generator 204 to the response queue 170. The read and write status signals 192, 196, respectively, are also transmitted from the response generator 204 to the response queue 170, either alone in the case of some of the write status signals or in combination with read data signals in the case of the read status signals or the other write status signals. Thus, the read response 210 contains the read data as well as information uniquely identifying the read request corresponding to the read data, and the write response 214 contains information uniquely identifying each write request serviced by the memory module 130.

The number of write requests or read requests that can be outstanding in any memory module 130 before the memory request queue 160 will not issue any additional memory requests can be either fixed or user selectable by programming either the memory hub controller 126 with values indicative of the allowable request queue depth. Further, the number of read requests that can be outstanding may be the same or be different from the number of write requests that can be outstanding.

Figures 3A, 3B:
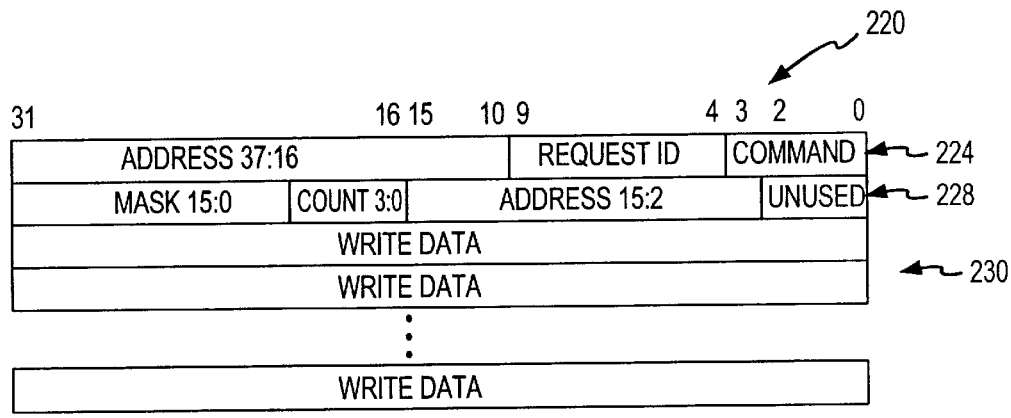
FIGS. 3A and 3B are tables showing one example for the format of a memory request packet transmitted from the memory hub controller to the memory hub of FIG. 2.

An example of a memory request coupled from the memory request queue 160 in the memory hub controller 126 to the memory request queue 190 in the memory hubs 140 is shown in FIG. 3A. In the example shown in FIG. 3A, the memory request is in the form of a memory request packet 220 containing several packet words, although the memory requests can have other formats, as will be apparent to one skilled in the art. The first 4 bits of a first packet word 224 are a Command code that identifies the type of memory request being issued by the request queue 160. These command codes are identified in FIG. 3B. For example, a command code of "0000" signifies a no operation command, a command code of "0001" signifies request to write between 1 and 16 double words (i.e., groups of 32 bits), a command code of "0010" signifies request to read between 1 and 16 double words, etc. Returning to FIG. 3A, the next 6 bits of the first packet word 224 comprise the Request ID issued by the flow control unit 174 (FIG. 2) that uniquely identifies each memory request. As previously explained, by uniquely identifying the memory requests, the flow control unit 174 in the memory hub controller 126 can determine which memory requests have been serviced. The final 22 bits of the first packet word 224 are the high order bits 37:16 of a memory address to which the memory request is directed.

The first 2 bits of a second packet word 228 are unused in the packet example shown in FIG. 3A. The next 15 bits are the low order bits 15:2 of the memory address to which the memory request is directed. There are no address bits 1:0 transmitted because such address bits would select specific bits in each byte of data, and all memory accesses are to at least a byte of data.

The memory request queue 190 in one of the memory hubs 140 may use the high order bits 37:16 as a row address and the low order bits 15:2 as a column address, or it may use these addresses in some other manner. The next 4 bits of the second packet word 228 are Count 3:0 bits that specify the number of double words or bytes that will be read from or written to the memory devices 148 on the memory module. The final 16 bits of the second packet word 228 consist of mask data Mask 15:0 that can be coupled to the memory hub controller 126 instead of read data called for by a read memory request. Masking data in this manner is well known to one skilled in the art.

Following the first 2 packet words 224, 228 for a write request is at least one packet word 230 of write data. The number of packet words 230 will depend upon the value of Count 3:0 in the second packet word 228 and whether the memory write command is for writing a double word or a byte. For example, a Count 3:0 value of "0100" (i.e., 4) in a packet requesting a double word write will require 4 packet words 230 of write data. A Count 3:0 value of 4 in a packet requesting a byte write will require only a single packet word 230 of write data. A packet 220 for a read request will not, of course, include any packet words 230 following the first two packet words 224, 228.

Figures 4A, 4B:
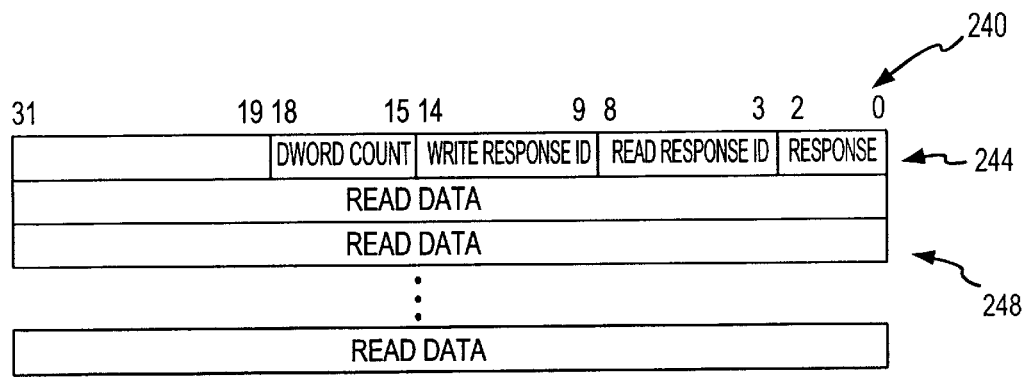
FIGS. 4A and 4B are tables showing one example for the format of a memory response packet transmitted from the memory hub controller to the memory hub of FIG. 2.

An example of a memory response 210 or 214 coupled from the response generator 204 in one of the memory hubs 140 to the memory response queue 170 in the memory hub controller 126 is shown in FIG. 4A. The memory response is in the form of a memory response packet 240 containing several packet words, although the memory requests can have other formats as will be apparent to one skilled in the art. The first 4 bits of a first packet word 244 is a Response Code that identifies the type of memory response being transmitted by the response generator 204. These Response codes are shown in FIG. 4B. For example, a Response code of "000" again signifies a "No Operation" response, and a Response code of "001" signifies a "Read Response," which will return read data and read status signals indicating which read request has been serviced to the response queue 170 in the memory hub controller 126. A Response code of "010" signifies a "Write Response," which will provide write status signals to the response queue 170 in the memory hub controller 126 indicating which write request has been serviced. Finally, a Response code of "011" signifies a "Write and Read Response," which will include read status signals and write status signals in a packet containing read data. As mentioned above, the write status signals in the packet will not pertain to the same memory request as the memory request for the read data signals in the packet. In general, it is more efficient to provide write status signals by including them with read data in a Write and Read Response since only one response is required to provide both read and write status information. However, if data is not being read from a memory module 130, then it may be necessary to return a "Write Response" to provide the memory hub controller 126 with information about the status of write requests. However, "Write Response" packets can be delayed, if desired, until a predetermined number of outstanding write responses have accumulated in any one of the memory modules 130.

Returning to FIG. 4A, the next 6 bits of the first packet word 244 are the Read Response ID generated by the flow control unit 194, which uniquely identifies each memory read request. This Read Response ID will generally correspond to the Request ID in the first packet word 224 of each read request packet 220. The Read Response ID corresponds to the read status signals referred to above. The next 6 bits of the first packet word 244 are a Write Response ID also generated by the flow control unit 194 that uniquely identifies each memory write request. This Write Response ID will again generally correspond to the Request ID in the first packet word 224 of each write request packet 220. The Write Response ID corresponds to the write status signals referred to above. The flow control unit can compare these Response ID values to the Request values to determine if any read or write memory request issued by the memory hub controller 126 has been serviced. The next 4 bits of the first packet word 244 are Dword Count bits that specify the number of double words of read data will be included in the packet 240. The final 13 bits of the first packet word 244 are unused. If the response packet 240 is a read response packet, the first packet word 244 will be followed by one or more read data packet words 248. The number of read data packet words will, of course, depend on the value of Dword Count in the packet word 244.

From the foregoing it will be appreciated that, although specific embodiments of the invention have been described herein for purposes of illustration, various modifications may be made without deviating from the spirit and scope of the invention. For example, although the memory hub controller 126 has been described as permitting a specific number or programmable number of memory requests to be outstanding in any memory module 130, other operating protocols are possible. Also, rather than simply delay issuing memory requests to a memory module 130 having too many outstanding memory requests, the memory hub controller 126 may instead route memory requests to a different memory module 130. Accordingly, the invention is not limited except as by the appended claims.

What is claimed is:

1. A memory module, comprising:
a plurality of memory devices; and
a memory hub, comprising:
a memory request queue storing a least one memory request received through an input port, the memory request queue being coupled to the memory devices to transmit each memory request stored in the memory request queue to the memory devices, the memory request queue being operable to output a respective read released signal identifying each read memory request transmitted to the memory devices and to output a respective write released signal identifying each write memory request transmitted to the memory devices;
a flow control unit coupled to the memory request queue, the flow control unit being operable to receive the read released signal and the write released signal from the memory request queue, the flow control unit being operable to output status signals corresponding to the released signals;
a memory read queue coupled to the memory devices, the memory read queue receiving read data from the memory devices and storing the read data for coupling to an output port;
a memory write queue coupled to receive a signal indicating that each write memory request has been coupled from the memory request queue to the memory devices, the memory write queue storing signals indicating that a write request has been transmitted to the memory devices; and
a response generator coupled to the flow control unit, the memory read queue and the memory write queue, the response generator being operable to generate and transmit from an output port read responses each containing the read data from the read data queue and a read status signal corresponding to a status signal from the flow control unit, the response generator further being operable to transmit from the output port write responses each containing a write status signal corresponding to a status signal from the flow control unit.

2. The memory module of claim 1 wherein the memory devices comprises respective dynamic random access memory devices.

3. The memory module of claim 1 wherein the input port of the memory request queue in the memory hub and the output port of the response generator in the memory hub comprises optical input and output ports, respectively.

4. The memory module of claim 1 wherein the memory request queue is operable to simultaneously store both read memory requests and write memory requests.

5. The memory module of claim 1 wherein the read released signal is coupled to the flow control unit responsive to the memory request queue transmitting each read request to the memory devices, and wherein the write released signal is coupled to the flow control unit responsive to the memory request queue transmitting each write request to the memory devices.

6. The memory module of claim 5 wherein the flow control unit is operable to output a read status signal corresponding to each read released signal, each read status signal uniquely identifying a respective read request, and wherein the flow control unit is operable to output a write status signal corresponding to each write released signal, each write status signal uniquely identifying a respective write request.

7. The memory module of claim 1 wherein the response generator is operable to generate and transmit from an output port a write response signal containing either the write status signal or a combination of the read data and the write status signal.

8. The memory module of claim 1 wherein the response generator is operable to generate and transmit from an output port a read response signal containing either read data and the read status signal or read data, the read status signal and the write status signal.

9. The memory module of claim 8 wherein the response generator is further operable to generate and transmit from an output port a write response signal containing the write status signal without the read data.

10. A memory hub controller comprising:
a memory request queue storing at least one memory request received through an input port, the memory request queue being operable to issue from an output port each memory request stored in the memory request queue responsive to a flow control signal;
a response queue coupled to receive through an input port read responses containing each read data and a read status signal identifying the read request corresponding to the read data, the response queue further being coupled to receive through the input port write responses each identifying a write requests that has been serviced, the response queue being operable to couple at least the read data from each read response signal to a data output port and to couple the read status signal from each read response and the write status signal from each write response to a flow control port; and
a flow control unit coupled to receive the read status signals and the write status signals from the response queue, the flow control unit being operable to determine from the status signals the number of outstanding memory requests issued by the memory request queue and to generate and couple to the memory request queue a flow control signal indicating that additional memory requests can be sent to each of the memory modules based on the number of outstanding memory requests issued by the memory request queue.

11. The memory hub controller of claim 10 wherein the memory request queue is further operable to issue from the output port along with each memory request a request identification uniquely identifying the respective memory request.

12. The hub module controller of claim 11 wherein the flow control unit is operable to generate and couple to the memory request queue the request identification for each memory request, and wherein the flow control unit is further operable to generate the flow control signal on the basis of a comparison between the request identification coupled to the memory request queue and the read status signals and the write status signals received from the response queue.

13. The memory hub controller of claim 11 wherein the output port of the memory request queue and the input port of the response queue comprise optical output and input ports, respectively.

14. The memory hub controller of claim 11 wherein the memory request queue is operable to simultaneously store both read memory requests and write memory requests.

15. A memory system comprising:
a plurality of memory modules, each of the memory modules comprising:
a plurality of memory devices;
a memory request queue storing at least memory one request received through an input port, the memory request queue being coupled to the memory devices to transmit each memory request stored in the memory request queue to the memory devices, the memory request queue being operable to output a respective read released signal identifying each read memory request transmitted to the memory devices and to output a respective write released signal identifying each write memory request transmitted to the memory devices;
a flow control unit coupled to the memory request queue, the flow control unit being operable to receive the read released signal and the write released signal from the memory request queue, the flow control unit being operable to output status signals corresponding to the read released and write released signals;
a memory read queue coupled to the memory devices, the memory read queue receiving read data from the memory devices and storing the read data for coupling to an output port;
a memory write queue coupled to receive a signal indicating that each write memory request has been coupled from the memory request queue to the memory devices, the memory write queue storing the signals for coupling to an output port; and
a response generator coupled to the flow control unit, the memory read queue and the memory write queue, the response generator being operable to generate and transmit from an output port read responses each containing the read data from the read data queue and a read status signal corresponding to a status signal from the flow control unit, the response generator further being operable to transmit from the output port write responses each containing a write status signal corresponding to a status signal from the flow control unit; and
a memory hub controller comprising:
a memory request queue storing at least one memory request received through an input port, the memory request queue being coupled to the memory request queue of each of the memory modules to transmit each memory request stored in the memory request queue to at least one of the memory modules responsive to a flow control signal;
a response queue coupled to the response generator in each of the memory modules, the response queue being coupled to receive the read responses and the write responses from the response generators in the memory modules, the response queue being operable to couple at least the read data from each read responses to a data output port and to couple the read status signal from each read response and the write status signal from each write response to a flow control port; and a flow control unit coupled to receive the read status signals and the write status signals from the response queue of the memory hub controller, the flow control unit being operable to determine from the status signals the number of outstanding memory requests in each of the memory modules and to generate and couple to the memory request queue of the memory hub controller a flow control signal indicating that additional memory requests can be sent to each of the memory modules based on the number of outstanding memory requests in each of the memory modules.

16. The memory system of claim 15 wherein the memory devices comprises respective dynamic random access memory devices.

17. The memory system of claim 15 wherein the input port of the memory response queue in the memory hub controller and the input port of each memory request queue in the memory modules comprise respective optical input ports, and wherein the output port of the memory request queue in the memory hub controller and the output port of each memory response generator in the memory modules comprise respective optical output ports.

18. The memory system of claim 15 wherein the memory request queues in the memory hub controller and in each of the memory modules are operable to simultaneously store both read memory requests and write memory requests.

19. The memory system of claim 15 wherein the read released signal is coupled to the flow control unit in each memory module responsive to the memory request queue in the memory module transmitting each read request to the memory devices in the memory module, and wherein the write released signal is coupled to the flow control unit in each memory module responsive to the memory request queue in the memory module transmitting each write request to the memory devices in the memory module.

20. The memory system of claim 19 wherein the flow control unit in each memory module is operable to output a read status signal corresponding to each read released signal, each read status signal uniquely identifying a respective read request, and wherein the flow control unit in each memory module is operable to output a write status signal corresponding to each write released signal, each write status signal uniquely identifying a respective write request.

21. The memory system of claim 19 wherein the response generator in each memory module is operable to generate and transmit from an output port a write response containing either the write status signal or a combination of the read data and the write status signal.

22. The memory system of claim 15 wherein the response generator in each memory module is operable to generate and transmit from an output port a read response containing either read data and the read status signal or read data, the read status signal and the write status signal.

23. The memory system of claim 22 wherein the response generator is further operable to generate and transmit from an output port a write response containing the write status signal without the read data.

24. The memory system of claim 15 wherein the memory request queue in the memory hub controller is further operable to issue from the output port along with each memory request a request identification uniquely identifying the respective memory request.

25. The memory system of claim 15 wherein the flow control unit in the memory hub controller is operable to generate and couple to the memory request queue the request identification for each memory request.

26. The memory system of claim 25 wherein the flow control unit in the memory hub controller is further operable to generate the flow control signal on the basis of a comparison between the request identification coupled to the memory request queue and the read status signals and the write status signals received from the response queue.

27. A memory system comprising:

a memory hub controller storing a plurality of memory requests and outputting each stored memory request responsive to a flow control signal generated as a function of received memory request status signals, the memory hub controller further receiving and storing read data and the memory request status signals, the memory hub controller outputting the stored read data; and a plurality of memory modules coupled to the memory hub controller, each of the memory modules comprising:

a plurality of memory devices; and a memory hub coupled to receive the memory requests output from the memory hub controller, the memory hub storing the received memory requests and coupling memory request signals corresponding to the stored memory requests to the memory devices in the memory module, the memory hub being operable to receive read data from the memory devices and couple the read data to the memory hub controller with the memory request status signals, the memory request status signals identifying the memory requests that have been serviced by the memory devices coupled to the memory hub.

28. The memory system of claim 27 wherein the memory requests stored in and output from the memory hub controller comprise read memory requests and write memory requests.

29. The memory system of claim 27 wherein the memory hub controller comprises a memory request queue storing the memory requests and outputting the memory requests from the memory request queue responsive to the flow control signals.

30. The memory system of claim 27 wherein the memory hub controller is further operable to output with each memory request a request identifier that uniquely identifies the respective memory request.

31. The memory system of claim 30 wherein the memory hub controller is operable to generate the flow control signal by comparing the received memory request status signals to the request identifier.

32. The memory system of claim 31 wherein the memory hub is operable to generate the memory request status signals from the request identifier received from the memory hub controller.

33. The memory system of claim 32 wherein the memory hub is operable to couple the read data to the memory hub controller with the memory request status signals indicating the status of read requests, write requests and both read and write requests.

34. The memory system of claim 27 wherein the memory devices comprise dynamic random access memory devices.

35. A computer system, comprising:

a central processing unit ("CPU");

a system controller coupled to the CPU, the system controller having an input port and an output port;

an input device coupled to the CPU through the system controller;

an output device coupled to the CPU through the system controller;

a storage device coupled to the CPU through the system controller;

a memory hub controller storing a plurality of memory requests and outputting each stored memory request responsive to a flow control signal generated as a function of received memory request status signals, the memory hub controller further receiving and storing read data and the memory request status signals, the memory hub controller outputting the stored read data; and a plurality of memory modules coupled to the memory hub controller, each of the memory modules comprising:

a plurality of memory devices;

a memory hub coupled to receive the memory requests output from the memory hub controller, the memory hub storing the received memory requests and coupling memory request signals corresponding to the stored memory requests to the memory devices in the memory module, the memory hub being operable to receive read data from the memory devices and couple the read data to the memory hub controller with the memory request status signals, the memory request status signals identifying the memory requests that have been serviced by the memory devices coupled to the memory hub.

36. The computer system of claim 35 wherein the memory requests stored in and output from the memory hub controller comprise read memory requests and write memory requests.

37. The computer system of claim 35 wherein the memory hub controller comprises a memory request queue storing the memory requests and outputting the memory requests from the memory request queue responsive to the flow control signals.

38. The computer system of claim 35 wherein the memory hub controller is further operable to output with each memory request a request identifier that uniquely identifies the respective memory request.

39. The computer system of claim 38 wherein the memory hub controller is operable to generate the flow control signal by comparing the received memory request status signals to the request identifier.

40. The computer system of claim 39 wherein the memory hub is operable to generate the memory request status signals from the request identifier received from the memory hub controller.

41. The computer system of claim 40 wherein the memory hub is operable to couple the read data to the memory hub controller with the memory request status signals indicating the status of read requests, write requests and both read and write requests.

42. The computer system of claim 35 wherein the memory devices comprise dynamic random access memory devices.

43. A computer system, comprising:

a central processing unit ("CPU");

a system controller coupled to the CPU, the system controller having an input port and an output port;

an input device coupled to the CPU through the system controller;

an output device coupled to the CPU through the system controller;

a storage device coupled to the CPU through the system controller;

a plurality of memory modules, each of the memory modules comprising:

a plurality of memory devices;

a memory request queue storing at least memory one request received through an input port, the memory request queue being coupled to the memory devices to transmit each memory request stored in the memory request queue to the memory devices, the memory request queue being operable to output a respective read released signal identifying a read memory request transmitted to the memory devices and to output a respective write released signal identifying a write memory request transmitted to the memory devices;

a flow control unit coupled to the memory request queue, the flow control unit being operable to receive the read released signal and the write released signal from the memory request queue, the flow control unit being operable to output status signals corresponding to the read released and write released signals;

a memory read queue coupled to the memory devices, the memory read queue receiving read data from the memory devices and storing the read data for coupling to an output port;

a memory write queue coupled to receive a signal indicating that each write memory request has been coupled from the memory request queue to the memory devices, the memory write queue storing the signals for coupling to an output port; and a response generator coupled to the flow control unit, the memory read queue and the memory write queue, the response generator being operable to generate and transmit from an output port read responses each containing the read data from the read data queue and a read status signal corresponding to a status signal from the flow control unit, the response generator further being operable to transmit from the output port write responses each containing a write status signal corresponding to a status signal from the flow control unit; and a memory hub controller comprising:

a memory request queue storing at least one memory request received through an input port, the memory request queue being coupled to the memory request queue of each of the memory modules to transmit each memory request stored in the memory request queue to at least one of the memory modules responsive to a flow control signal;

a response queue coupled to the response generator in each of the memory modules, the response queue being coupled to receive the read responses and the write responses from the response generators in the memory modules, the response queue being operable to couple at least the read data from each read response to a data output port and to couple the read status signal from each read response and the write status signal from each write response to a flow control port; and a flow control unit coupled to receive the read status signals and the write status signals from the response queue of the memory hub controller, the flow control unit being operable to determine from the status signals the number of outstanding memory requests in each of the memory modules and to generate and couple to the memory request queue of the memory hub controller a flow control signal indicating that additional memory requests can be sent to each of the memory modules based on the number of outstanding memory requests in each of the memory modules.

44. The computer system of claim 43 wherein the memory devices comprises respective dynamic random access memory devices.

45. The computer system of claim 43 wherein the input port of the memory response queue in the memory hub controller and the input port of each memory request queue in the memory modules comprise respective optical input ports, and wherein the output port of the memory request queue in the memory hub controller and the output port of each memory response generator in the memory modules comprise respective optical output ports.

46. The computer system of claim 43 wherein the memory request queues in the memory hub controller and in each of the memory modules are operable to simultaneously store both read memory requests and write memory requests.

47. The computer system of claim 43 wherein the read released signal is coupled to the flow control unit in each memory module responsive to the memory request queue in the memory module transmitting each read request to the memory devices in the memory module, and wherein the write released signal is coupled to the flow control unit in each memory module responsive to the memory request queue in the memory module transmitting each write request to the memory devices in the memory module.

48. The computer system of claim 47 wherein the flow control unit in each memory module is operable to output a read status signal corresponding to each read released signal, each read status signal uniquely identifying a respective read request, and wherein the flow control unit in each memory module is operable to output a write status signal corresponding to each write released signal, each write status signal uniquely identifying a respective write request.

49. The computer system of claim 47 wherein the response generator in each memory module is operable to generate and transmit from an output port a write response signal containing either the write status signal or a combination of the read data and the write status signal.

50. The computer system of claim 43 wherein the response generator in each memory module is operable to generate and transmit from an output port a read response signal containing either read data and the read status signal or read data, the read status signal and the write status signal.

51. The computer system of claim 50 wherein the response generator is further operable to generate and transmit from an output port a write response signal containing the write status signal without the read data.

52. The computer system of claim 43 wherein the memory request queue in the memory hub controller is further operable to issue from the output port along with each memory request a request identification uniquely identifying the respective memory request.

53. The computer system of claim 43 wherein the flow control unit in the memory hub controller is operable to generate and couple to the memory request queue the request identification for each memory request.

54. The computer system of claim 53 wherein the flow control unit in the memory hub controller is further operable to generate the flow control signal on the basis of a comparison between the request identification coupled to the memory request queue and the read status signals and the write status signals received from the response queue.

55. A method of reading data from and writing to a plurality of memory modules, comprising:
 transmitting a plurality of memory request to the memory modules;
 storing the transmitted memory requests in the memory modules;
 servicing the stored memory requests in one of the memory modules at a rate that may differ from the rate at which the memory requests are transmitted to the memory module;
 determining the number of memory requests that have been transmitted to the memory module but not yet serviced by the memory module; and
 transmitting additional memory request to the memory modules as a function of the determination made as to the number of transmitted memory requests that have not yet been serviced by the memory module.

56. The method of claim 55 wherein the act of transmitting a plurality of memory request to the memory modules comprises transmitting either a write request or a read request to the memory modules along with a request identifier the uniquely identifies the write request or read request.

57. The method of claim 56 wherein the act of determining the number of memory requests that have been transmitted to the memory module but not yet serviced by the memory module comprises:
 receiving from the memory module a memory request status signal that identifies the read requests and write requests that have been serviced; and
 comparing the memory request status signals to the request identifiers.

58. In a computer system having a memory hub controller coupled to a plurality of memory modules each of which includes a plurality of memory devices, a method of accessing the memory modules using the memory hub controller, comprising:
 transmitting a plurality of memory request from the memory hub controller to at least one of the memory modules;
 storing the transmitted memory requests in the memory module to which the memory requests are transmitted;
 accessing the memory devices in the memory module in accordance with the memory requests, the memory devices being accessed at a rate that may differ from the rate at which the memory requests are transmitted to the memory module;
 generating in each of the memory modules memory request status signals that identify which memory requests have been serviced in the memory module;
 coupling the memory request status signals to the memory hub controller from the memory module containing the accessed memory devices; and
 transmitting additional memory requests from the memory hub controller to the memory module containing the accessed memory devices as a function of the memory request status signals coupled to the memory hub controller.

59. The method of claim 58 wherein the act of transmitting a plurality of memory request from the memory hub controller to at least one of the memory modules comprises transmitting either a write request or a read request from the memory hub controller to at least one of the memory modules.

60. The method of claim 58 wherein the memory devices comprise random access memory devices.

61. The method of claim 58 wherein the act of transmitting a plurality of memory request from the memory hub controller to at least one of the memory modules comprises transmitting with each memory request a respective request identifier the uniquely identifies the memory request.

62. The method of claim 61 wherein the act of generating the memory request status signals comprises generating the memory request status signals in the memory modules from the request identifiers transmitted to the memory modules.

63. The method of claim 61 further comprising storing in the memory controller each request identifier transmitted to the memory modules, and wherein the act of transmitting additional memory requests from the memory hub controller as a function of the memory request status signals comprises comparing in the memory hub controller the memory request status signals to the request identifiers stored in the memory hub controller.

* * * * *